M. A. DEES.
APPARATUS FOR FORMING AND VULCANIZING RUBBER ARTICLES.
APPLICATION FILED JULY 12, 1913.
1,109,048.
Patented Sept. 1, 1914.
4 SHEETS—SHEET 1.
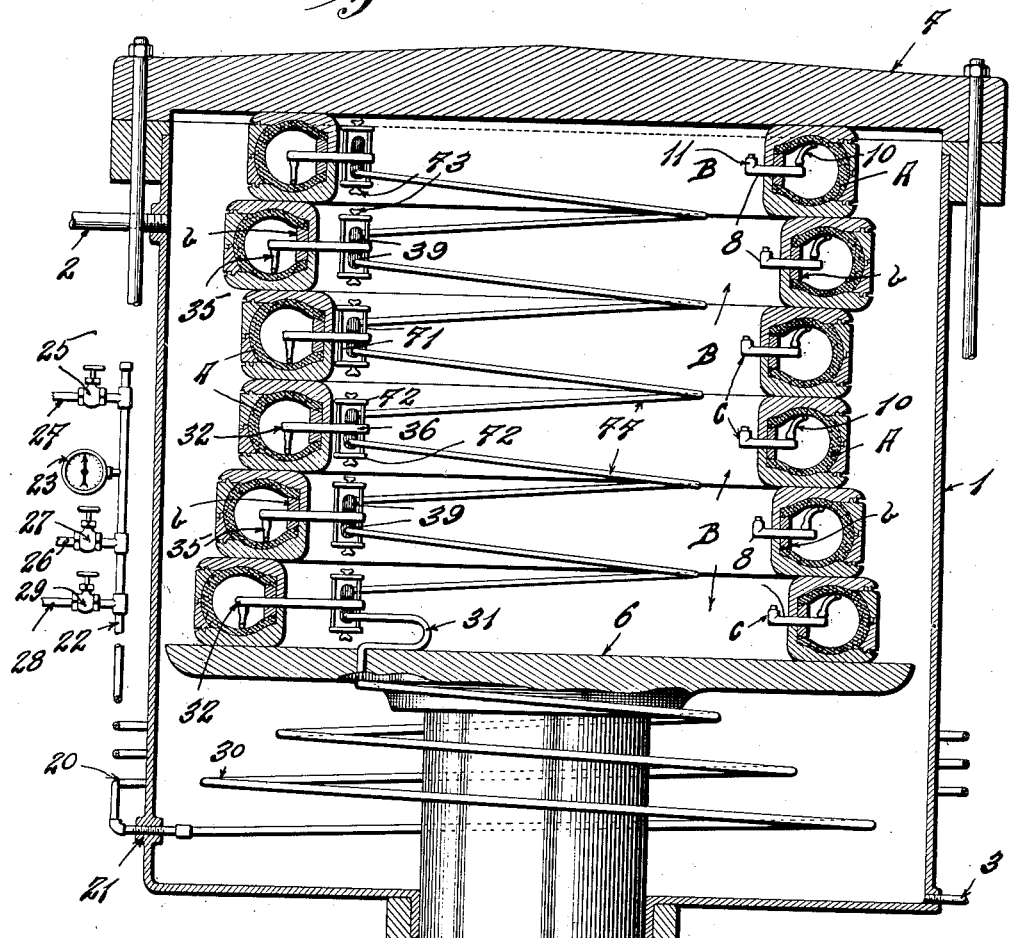

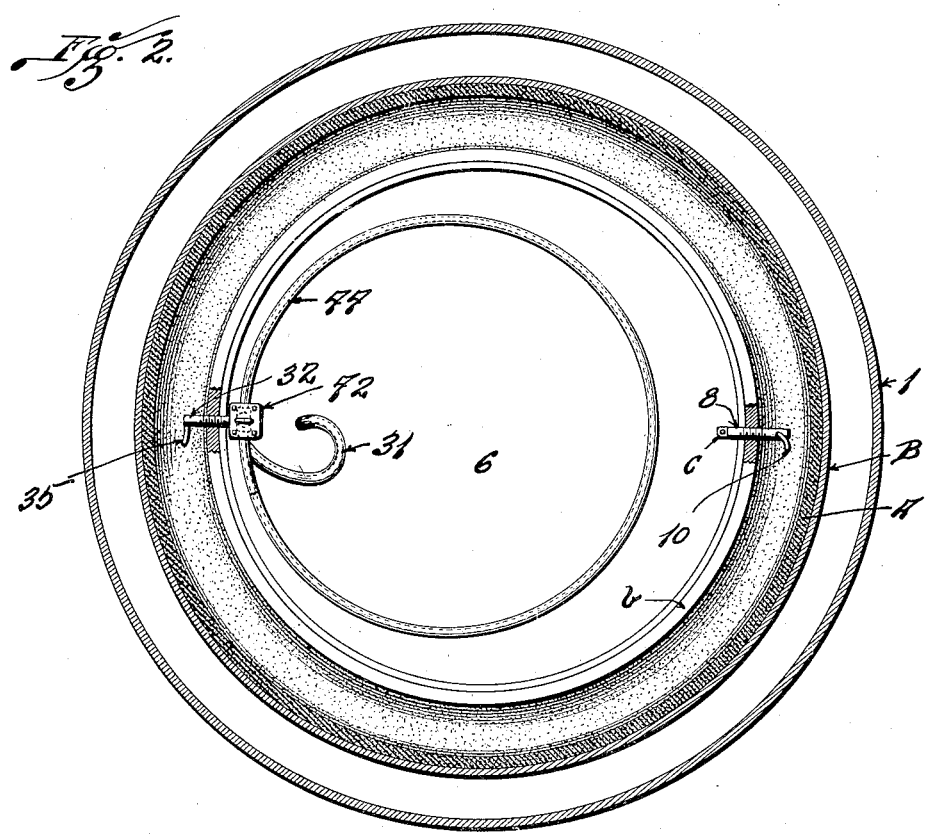

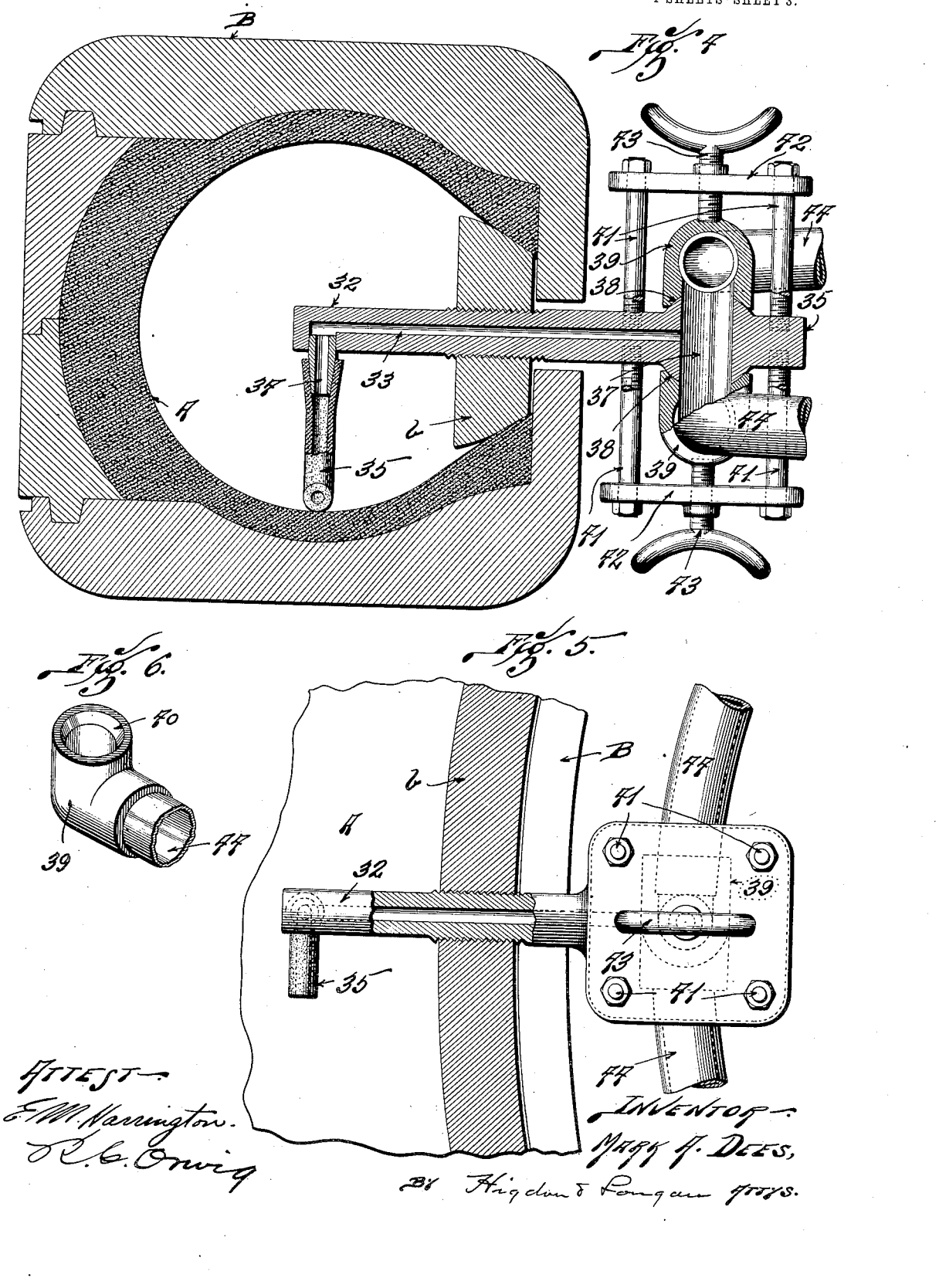

M. A. DEES.
APPARATUS FOR FORMING AND VULCANIZING RUBBER ARTICLES.
APPLICATION FILED JULY 12, 1913.
1,109,048.
Patented Sept. 1, 1914.
4 SHEETS—SHEET 4.
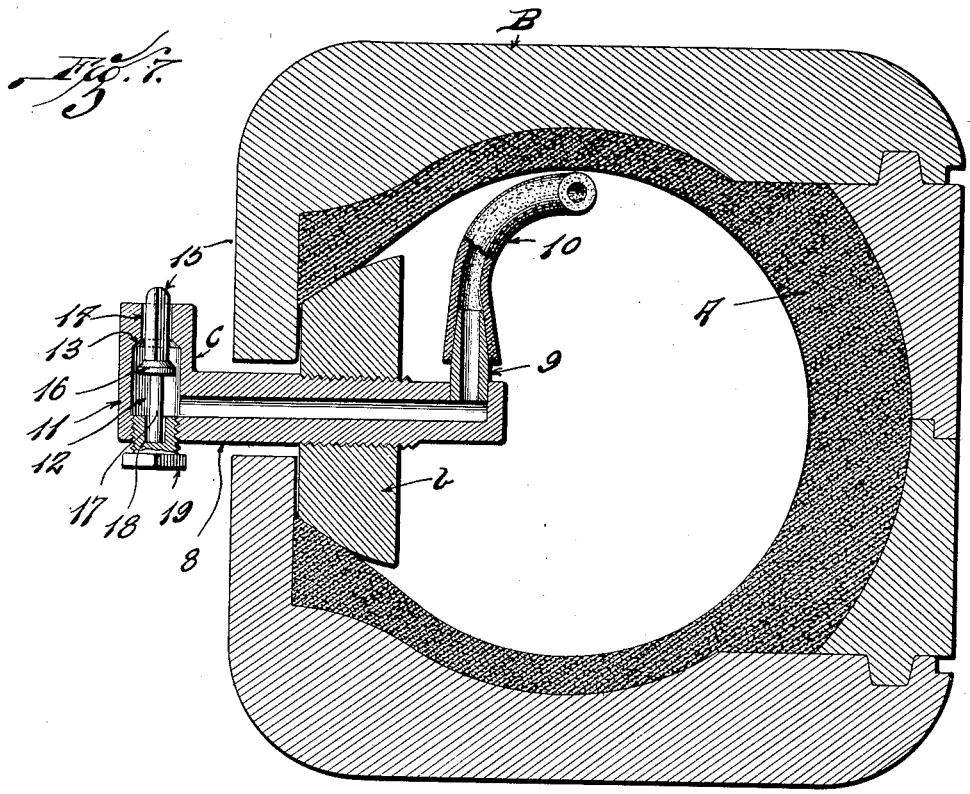
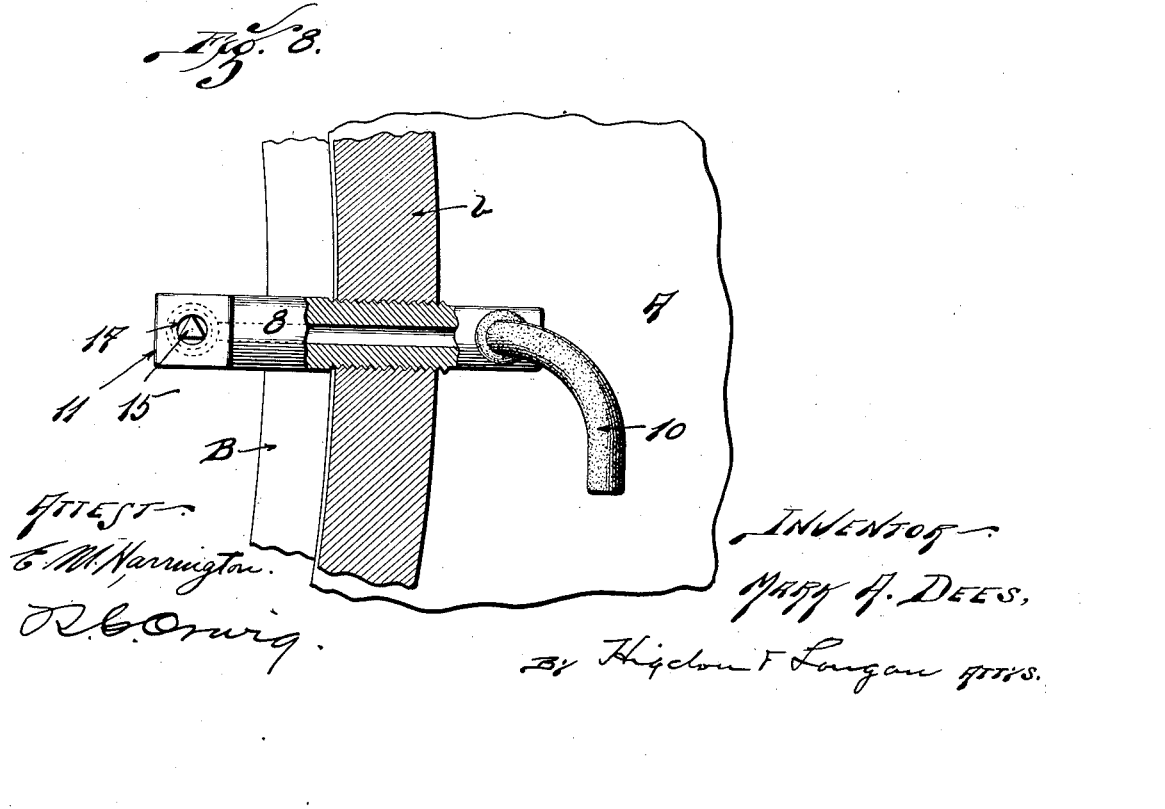

UNITED STATES PATENT OFFICE.

MARK A. DEES, OF ST. LOUIS, MISSOURI.

APPARATUS FOR FORMING AND VULCANIZING RUBBER ARTICLES.

1,109,048.   Specification of Letters Patent.   Patented Sept. 1, 1914.

Application filed July 12, 1913. Serial No. 778,772.

*To all whom it may concern:*

Be it known that I, MARK A. DEES, a citizen of the United States, and resident of St. Louis, Missouri, have invented certain new and useful Improvements in Apparatus for Forming and Vulcanizing Rubber Articles, of which the following is a specification containing a full, clear, and exact description, reference being had to the accompanying drawings, forming a part hereof.

My invention relates to an apparatus for use in forming and vulcanizing rubber articles, the apparatus being designed more particularly for use in forming and vulcanizing hollow rubber tires, the structures of which comprise rubber compounds, and fabric for reinforcing the rubber compounds.

To produce hollow rubber tires of maximum durability and wearing qualities, it is highly essential that the tires be formed and vulcanized under conditions that provide adjustment of the fabric elements for removal of looseness therefrom before vulcanization of the rubber compounds, so that the fabrics will not be subject to stretching after the tires are molded; and also under conditions providing for the proper and uniform compression of the rubber compounds previous to the vulcanization of such compounds. It is further highly essential that heat be so applied to the molds in which the tires are formed as to thoroughly vulcanize the rubber compounds throughout all portions of the tires; and further that the heating medium shall only become effective to vulcanize the rubber compounds after the tire structures have been formed. To produce a hollow rubber tire, the raw or uncured tire structure must be placed within a suitable mold or casing; and subjected to a high degree of pressure while therein, for the purpose of compacting and densifying the rubber compound, and for the further purpose of so forming the structure that the rubber compound will be vulcanized with the component parts of the tire positively and thoroughly cemented to each other; and to produce the most satisfactory tires, pressure must be applied internally of the tire structures to force their structural elements outwardly to the mold walls, after the tires have been confined in the molds or casings in which they are to be formed and vulcanized.

Apparatus of various descriptions have heretofore been used and proposed to be used; by which rubber tires may be formed and vulcanized, but all of these apparatuses have been lacking in one particular or another, for the production of tires formed and vulcanized under conditions which are the most favorable to the formation and vulcanization of the tires.

My invention has for its object to combine the meritorious features of former types, whereby I am enabled to form tire structures which are absolutely of uniform density at all points; which have their components thoroughly and uniformly cemented to each other, irrespective of variation of thickness of the tires at various points; and by which the fabrics in the tire structures may be adjusted in the rubber compounds, before vulcanization, and held in such adustment while the rubber compound is being vulcanized. These operations are carried out within a closed vessel supplied with heating medium to heat the molds externally, without opportunity for objectional radiation of heat from the mold.

A further object of my invention is to provide means whereby a tire mold or a series of molds placed in a closed vessel may be supplied from the exterior of said vessel, with fluid pressure medium to expand the raw tire and compress the rubber compound, and with fluid vulcanizing medium after the raw tire structure has been formed by expanding and compressing it to a uniform degree.

Referring to the accompanying drawings: Figure 1 is a vertical section of my apparatus; Fig. 2 is a horizontal section of the apparatus; Fig. 3 is a top or plan view of one of the fluid conducting pipes by which communication is established between adjoining molds; Fig. 4 is an enlarged cross section through one of the molds and the fluid conducting members at the mold, the parts of the mold having been pressed together and the raw tire having been expanded therein; Fig. 5 is a view, partly in horizontal section and partly in plan, of a fragment of one of the molds, and the fluid conducting members shown in Fig. 4; Fig. 6 is a perspective view of one of the coupling members shown in Figs. 4 and 5; Fig. 7 is a cross section taken through one of the molds and the automatic valve device associated therewith for venting air from the mold, and permitting the entrance of steam to the mold, the parts of the mold also having been pressed together and the raw tire also having been expanded therein; Fig. 8 is in part a section and in part a top or plan view of the air vent and steam admission device shown in Fig. 7.

In the drawings, I have illustrated my apparatus in the preferred construction.

The article to be treated being shown is a rubber tire, designated A, the tire having two edges at its inner circle and being built up of fabric and rubber compound, in accordance with the usual practice in making hollow or "open-bellied" tires of the pneumatic tire type. The tires A are incased within suitable sectional molds B, each mold including, in addition to shell sections, an abutment ring b, which is situated between the edges at the inner circle of the tire when the built up raw tire is placed within the mold, to remain in such position throughout the treatment of the tire. The abutment ring, by its position between the edges of the tire, permits of the tire edges being tightly clamped between said abutment ring and the shell sections of the mold to produce fluid tight joints, in order that fluids introduced into the tire occupying the mold cavity, may be retained therein for the treatment of the tire. Fluids are delivered into the tires by means which will be hereinafter fully described 1 designates a vulcanizer pot, through which steam is circulated, the pot, with this object in view, having connected to it pipes 2 and 3, one of which serves to admit live steam to the pot and the other of which allows the steam to escape from the pot. The vulcanizer pot 1 has a closure 4, which may be held in closed position by any suitable means, access to the pot being permitted by moving, either the body of the pot or the closure relative to the other part of the pot.

5 designates a hydraulic ram provided with a head or table 6, the latter being situated within the vulcanizer pot and being movable therein. The ram head 6 serves as a support for the molds B, and upon the movement of the ram and its head toward the opposing closure 4, the pressure exerted upon the sectional molds B causes the tires therein to be clamped within the molds between the mold sections and the abutment ring b to such degree as to render the joints of the molds fluid tight. Steam admitted into the vulcanizer pot is, therefore, excluded from the interior of the raw tires within the molds, except through means to be hereinafter described. The hydraulic ram 5 is operable in a cylinder 7, into which water or other fluid is introduced.

I next come to a description of the means by which fluids are conducted into the vulcanizer pot and into the interior of the raw tires in the molds B, for the purpose of first fully expanding and compressing the outer walls of the tires against the inner walls of said molds and, thereafter, vulcanizing the interior portions of the tires, while the exterior portions of the tires are being vulcanized by heat transmitted through the mold shells. It will, however, facilitate the description to first describe an automatic valve device C, by which communication is established between the interiors of each tire in each mold and the vulcanizer pot to, at one time vent air from the tire while a fluid is being delivered into the tire, and at another time admit steam into the tire from the pot to facilitate discharge of fluid contents of the tire. This valve device C comprises a tube 8 which extends through the abutment ring of the mold, the said tube being provided at its inner end with a nipple 9.

10 is a pipe secured to the nipple 9 and extending upwardly therefrom in the mold cavity so that its free open end terminates in proximity to the inner face of the tire A to receive fluid contents of the tire at the greatest elevation therein, or admit fluid at the same point. To provide for the pipe 10 becoming automatically adjusted to occupy the desired position without injuring the raw material at the interior of the tire by contact therewith, I preferably make said pipe of flexible and resilient material, such, for example, as rubber.

At the outer end of the tube 8 is a valve casing 11, containing a valve chamber 12, at one end of which is a valve seat 13. Extending through the valve casing 11 at the end of the valve chamber nearest the valve seat 13 is a duct 14, which has communication with the vulcanizer pot 1. A valve stem 15 carrying a valve 16 extends loosely through the duct 14, this stem being of such diameter, or so shaped, as to provide a space between the stem and the wall of the duct, through which fluid may flow when the valve is unseated. The valve 16 is located in the valve chamber 12, and is movable to and from the valve seat 13. The movement of said valve is directed by a guide rod 17 movable in a bore 18 provided therefor, which is preferably located in a plug 19.

As previously mentioned, I provide in my apparatus for the delivery of fluids to the interiors of the tires within the molds placed within the vulcanizer pot, to first expand the tires therein outwardly to the walls of the mold cavities and compress the rubber compounds of the tires, and after withdrawing the fluid utilized for this purpose, introduce into the tires a vulcanizing fluid. The introduction of these fluids into the tires and the draining of fluids from the tires is accomplished by fluid conducting means of which a description will now be given.

20 designates a fluid receiver in the form of a coil located exteriorly of the vulcanizer pot preferably in the form of a tube extending around the vulcanizer pot. The fluid receiver is extended through the wall of the vulcanizer pot at the point 21 in such manner as to prevent leakage at this point. The fluide receiver 20 is connected with a fluid conducting pipe to be hereinafter more particularly referred to. Fluids, such as those I will mention, are delivered under pressure to the receiver 20, through a receiver supply pipe 22, which is supplied with a gage 23. The receiver supply pipe has connected to it a water conducting pipe 24, provided with a cut off valve 25 and a steam conducting pipe 26, having a cut off valve 27. The water delivered through the pipe 24 is forced therethrough under pressure derived by any suitable means, such, for example, as a pump, (not shown), and the pressure of the steam delivered through the pipe 26 to the main supply pipe 22 may be regulated in any well known manner. The receiver supply pipe 22 has also connected to it a drain pipe 28, which is supplied with a cut off valve 29.

30 designates the previously mentioned fluid conducting pipe extending from the fluid receiver 20 into the vulcanizer pot 1. This pipe 30 in the form of a coil is connected with the head of the ram 5 and is carried at its one end with said ram in its movements.

31 designates a fluid conducting pipe carried by the ram head 6 and in communication with the conducting pipe 30 and the fluid receiver 20. The conducting pipe 31 is located above the ram head, the said pipe being preferably flexible.

32 designates nozzles arranged in and extending through the abutment rings b of the molds B, each nozzle having a longitudinal duct 33 therein, which is of less diameter than the internal diameters of fluid conducting pipes fitted to the nozzles exteriorly of the molds. The nozzles 32 extend to the interiors of the tires to such degree as to provide for nipples 34 carried thereby at their inner ends, being located at approximately the centers of the chambers within the tires confined in the molds. The nipples 34 have fitted to them pipes 35 which extend downwardly and rest upon the inside faces of the confined tires, the said pipes being preferably flexible or resilient in order that their free ends will become seated upon the inside faces of the tires when the molds are closed after the positioning of the tires therein. In order that the pipes 35 may adjust themselves automatically to the inner faces of the tires, as mentioned, and do this without injury to the raw tire when the mold is first closed, I prefer to make them of rubber.

The nozzles 32 are provided externally of the molds with heads 36, having transverse ducts 37 therein, communicating with the longitudinal ducts in the nozzles, the transverse ducts being of greater diameter than said longitudinal ducts. At the top and bottom, or opposite sides of the nozzle heads, are convex annular seats 38, which surround the transverse ducts 37, and which receive pipe coupling members 39 provided with concave seats 40 fitting against the annular convex seats 38 of the nozzles 32. The coupling members 39 are carried by the pipes to be described and may be held to the nozzles by any suitable means, but preferably by the devices I have illustrated, which comprise rods 41 secured to the heads of the nozzles, plates 42 attached to said rods, and set screws 43 in said plates bearing against the pipe coupling members.

44 designates flexible fluid conducting pipes by which communication is established between a series of molds used in my apparatus and which are carried by the coupling members 39. The conducting pipe 31 in communication with the conducting pipe 30 is provided with a coupling member 39 which is fitted to the nozzle 32 of the mold next adjacent to the ram head 6, and fluid passing through the pipe 31 is delivered to said nozzle so that it will pass through the transverse duct 37 therein, and through the longitudinal duct 34 to the interior of the tire confined within said mold. It is also to be noted that the fluid will pass through the transverse duct in the nozzle to the second nipple 39 and enter the first conducting pipe 44. From the last mentioned pipe the fluid enters the nozzle 32 associated with the next adjacent mold and partakes of flow in the two directions similar to that it partook of at the first nozzle. Flow of fluid is thus continued throughout the entire series of molds connected in series by the pipes 44. The conducting pipes 44 are preferably made in ring form, as most clearly seen in Figs. 2 and 3 to render them flexible.

I will now proceed to a description of the procedure in the use of my apparatus.

The raw and partially formed tires prepared in any ordinary manner are first introduced into the molds B, with the abutment rings b located between the edges of the tires after the nozzles 32 with appended parts and the automatic valve devices C comprising the tubes 8 and the parts appended thereto, are mounted in the abutment ring. The first mold is placed upon the ram head 6, and the coupling member 39 at the end of the fluid conducting pipe 31 is coupled to the head of the nozzle 32 extending into the tire in said mold. The next mold is then placed upon the first mold, and, to provide for the delivery of fluid thereto, the coupling member 39 at one end of the first flexible fluid conducting pipe 44 is coupled to the head of the nozzle 32 extending into the first mold, and the member 39 at the opposite end of said conducting pipe 44 is coupled to the head of the nozzle extending into the second mold. Additional molds are thereafter arranged above the first two, and pipes 44 are connected to the nozzles of the molds, in the manner explained, until the number of molds to be used at one time in my apparatus has been put in place and fluid conductors have been coupled to all of them. The transverse duct 37 in the nozzle 32 at the last mold is, of course, closed at one end to prevent discharge of fluid from said nozzle into the vulcanizer pot. As many molds containing tires to be formed and vulcanized as it may be desired to treat at one time, dependent upon the capacity of the apparatus, are placed in the manner described, one against another, and connections of the flexible fluid conducting pipes are made thereto throughout the series of molds so that the fluid flowing from the conducting pipe 30 and entering the conducting pipe 31 may pass through the transverse ducts 37 in the nozzles 32 and to and from the conducting pipes 44. As the fluid partakes of such flow, it passes to the interior of each mold by traversing the longitudinal duct 33 in the nozzle 32 extending into the mold; but, inasmuch as said longitudinal ducts are made of smaller diameter than the internal diameters of the conducting pipes 30, 31 and 44 and the transverse ducts 37 in the nozzles, the pressure of the fluid is not materially reduced by entering the molds nearest the source of fluid supply, and substantially the same fluid pressure is preserved throughout the entire series of molds. When the molds have been arranged in assembled positions one against another, so as to be all supported in series by the ram head 6 with fluid conducting pipes coupled thereto, as explained the body remains separated from the closure of the pot and is allowed to so remain during a preliminary testing procedure. To carry out this procedure fluid under pressure is introduced into the cylinder 7 beneath the hydraulic ram 5, and said ram is moved to elevate its head 6, and the molds supported thereby, with the result of clamping the molds between the ram head and the closure of the vulcanizer pot. By so clamping the molds, the shell sections of the several molds are forced toward each other, causing the edges of the raw tires in the molds to be clamped between the mold shell sections and the abutment rings b. It will be noted that by this procedure, I effectually confine the raw tires within the molds without the use of any bolts or fastening means, such as are usually employed for this purpose. After the molds have been tightly pressed between the mold moving means and the closure of the vulcanizer pot and after the introduction of fluid under pressure into all of the tires in the molds, as herein described, the molds are examined for leakage and if no leaks are found the body is secured in place against the closure 4. My apparatus with the molds coupled, as explained, is now ready for the introduction of steam into the vulcanizer pot, for circulation in contact with the molds. In the practical use of my apparatus, I first force cold water, or water of low temperature, subjected to pressure as previously explained, into the fluid receiver 20 by opening the cut-off valve 25, the cut-off valves 27 and 29 of the steam conducting and drain pipes 26 and 28 being closed. The water delivered to the fluid receiver 20, which is located on the exterior of the vulcanizer pot, passes therefrom through the wall of the vulcanizer pot at 21 into the latter and through the conducting pipe 30 located in the interior of the vulcanizer pot and to the conducting pipe 31 thereabove, from which it is delivered into the nearest mold B through the nozzle 32 leading thereinto. The water passes also through the transverse duct in said nozzle to enter and flow through the first connecting pipe 44 to the nozzle of the second mold and therethrough into the second mold and the second pipe 44 to the third mold. In like manner, the water traverses all of the connecting pipes 44 and is delivered to the interiors of all of the molds.

It is highly necessary that, when water is delivered into the molds B, the air be exhausted from the interiors of the raw tires confined in the molds, and one of the functions of my automatic valve devices C is that of venting such air. The pipes 10 of these automatic valve devices being located in the mold cavities so that they extend upwardly into juxtaposition with the raw tires in the mold cavities, the air within the tires enters and passes through the tubes 8 of the valve devices C when subjected to the pressure of water entering into the raw tires, the valves 16 of the automatic valve devices remaining open until the air is completely vented from the molds through the tubes 8 and valve chambers 12 to the vulcanizer pot by the pressure of water thereagainst. Immediately following the venting of the air, water by entering the pipes 10 from the raw tires passes through the tubes 8 to the valve chambers 12 and closes the valves 16, so that the water is confined in the tires. Steam is then admitted into the vulcanizer pot 1 to circulate therein, under pressure less than the pressure of the water which has been forced into the interiors of the tires in the molds B. The water, being of low temperature, serves as an initial pressure medium within the raw tires confined in the molds, and acts to expand these tires to the wall of the mold cavity and compress the rubber compound in the raw tires previous to vulcanization of the rubber, so that the tires will be perfectly formed and compacted under fluid pressure, which is uniform in its action and performs its function throughout the raw tire, irrespective of any variation at different points in the built up fabric and rubber compound tire structure. The water is retained within the unvulcanized tires for a predetermined period, until the molds have become heated by the steam circulating in the vulcanizer pot. As the preferred next step in the operation of my apparatus, I close the cut off valve 25 controlling the flow of water to the fluid receiver 20 and open the cut off valve 29 controlling flow through the drain pipe 28. The water in the fluid receiver and in the molds B then commences to escape through the drain pipe 28, and as soon as the pressure within the tires confined in the molds has been reduced to a degree less than that of the steam present in the vulcanizer pot, steam acts to unseat the valves 16 in the automatic valve devices C, which have previously been held closed by pressure of water. Steam then passes through the automatic valve devices to the interior of the tires and acts to force the water therefrom until they and the pipe connections leading from the receiver 20 are completely drained. I next close the cut-off valve 29 in the drain pipe 28 and open the cut-off valve 27 of the steam conducting pipe 26, with the result of permitting steam under pressure to pass from said steam conducting pipe to the fluid receiver 20, therefrom through the fluid conducting pipe 30 and pipes 31, 44 and nozzles 32 to the interiors of the tires within the molds B. The steam thus admitted from the exterior of the vulcanizer pot to the interiors of the unvulcanized tires and, immediately upon the tires becoming filled with steam, at a greater pressure than the pressure of the steam in the vulcanizer pot, the valves 16 of the automatic valve devices C are closed by the steam in said automatic valve devices, this closure of the valves being effected due to the pressure of the steam within the tires being greater than the pressure of the steam within the vulcanizer pot. The pressure of steam in the tires confined in the molds is continued until the tires have been completely vulcanized, partly by the heat applied thereto through the medium of the steam delivered to the interiors of the tires, and partly by the circulation of steam in the vulcanizer pot. The tires are, therefore, thoroughly cured, the curing being much more perfect than it is possible to effect by any tire forming and vulcanizing apparatus which does not provide for the application of vulcanizing medium at both the interiors of the tires and the exteriors of the molds when the latter are housed within the vulcanizer pot.

I claim:

1. An apparatus for forming and vulcanizing rubber articles, comprising a vulcanizer pot, a mold confined within said vulcanizer pot, mold moving means in said vulcanizer pot and means for conducting fluid from the exterior of said vulcanizer pot to the interior of said mold.

2. An apparatus for forming and vulcanizing rubber articles, comprising a vulcanizer pot, a mold confined within said vulcanizer pot, mold moving means in said vulcanizer pot, means for conducting fluid from the exterior of said vulcanizer pot to the interior of said mold, and means operable at the exterior of said vulcanizer pot whereby the admission of fluid to and discharge of fluid from said mold may be controlled.

3. An apparatus for forming and vulcanizing rubber articles, comprising a vulcanizer pot, a mold confined within said vulcanizer pot, mold moving means in said vulcanizer pot, means for conducting fluid from the exterior of said vulcanizer pot to the interior of said mold, and means through which said fluid is vented from said mold to the exterior of said vulcanizer pot.

4. An apparatus for forming and vulcanizing rubber articles, comprising a vulcanizer pot, mold moving means in said vulcanizer pot, a mold in said vulcanizer pot movable by said moving means, a fluid receiver, a fluid conducting pipe carried by said mold moving means for delivering fluid from said fluid receiver to the interior of said mold, means for supplying fluid to said fluid receiver for delivery to the interior of said mold, means for venting fluid from said mold, and means for introducing a second fluid to said receiver for delivery into said mold.

5. An apparatus for forming and vulcanizing rubber articles, comprising a vulcanizer pot, a mold confined within said vulcanizer pot, an automatic valve device providing communication between the interior of said mold and the interior of said vulcanizer pot, and means for delivering fluid under pressure from the exterior of said vulcanizer pot to the interior of said mold.

6. An apparatus for forming and vulcanizing rubber articles, comprising a vulcanizer pot, a mold confined in said vulcanizer pot, a nozzle leading into the interior of said mold provided with a pipe extending toward the bottom of the mold cavity therein, and means for conducting fluid under pressure from the exterior of said vulcanizer pot to said nozzle.

7. In an apparatus for forming and vulcanizing rubber articles, a vulcanizer pot, a mold confined within said vulcanizer pot, means for delivering fluid under pressure from the exterior of the vulcanizer pot to the interior of said mold, and an automatic valve device providing communication between the interior of said mold and the interior of said vulcanizer pot, said automatic valve device including a fluid conducting member extending toward the top of the mold cavity.

8. An apparatus for forming and vulcanizing rubber articles, comprising a vulcanizer pot, a plurality of molds confined in said vulcanizer pot, flexible fluid conducting means within said vulcanizer pot leading to the several molds, and means for delivering fluid under pressure from the exterior of said vulcanizer pot to said flexible fluid conducting means within the pot.

9. An apparatus for forming and vulcanizing rubber articles, comprising a vulcanizer pot, a plurality of molds confined in said vulcanizer pot, a plurality of flexible fluid conductors for delivering fluid to the several molds, means for exerting pressure upon said molds to render them fluid tight, and means for delivering fluid under pressure from the exterior of the pot to said flexible conductors.

10. An apparatus for forming and vulcanizing rubber articles, comprising a vulcanizer pot, a hydraulic ram operable in said vulcanizer pot, a mold seated against said hydraulic ram and adapted to be subjected to pressure of said ram to render said mold fluid tight, and means for conducting fluid under pressure from the exterior of said vulcanizer pot to the interior of said mold.

11. An apparatus for forming and vulcanizing rubber articles, comprising a vulcanizer pot, a plurality of molds confined within said vulcanizer pot, fluid conductors leading to the several molds, a pressure device for exerting pressure upon said molds to render them fluid tight, and means at the exterior of said vulcanizer pot for delivering fluid under pressure into the several molds confined in said vulcanizer pot.

12. An apparatus for forming and vulcanizing rubber articles, comprising a vulcanizer pot, a series of molds confined within said vulcanizer pot, flexible fluid conductors leading to said molds in series, means for exerting pressure upon said molds to render them fluid tight, and means at the exterior of said vulcanizer pot communicating with said flexible conductors to deliver fluid under pressure to the interiors of said molds.

13. An apparatus for forming and vulcanizing rubber articles, comprising a vulcanizer pot, a mold confined within said vulcanizer pot, means for introducing a fluid into said mold from the exterior of said vulcanizer pot, means for venting said fluid from said mold to the exterior of the vulcanizer pot, and means for introducing a vulcanizing fluid into said mold from the exterior of the vulcanizer pot after the fluid first introduced into the mold has been vented therefrom.

14. An apparatus for forming and vulcanizing rubber articles, comprising a vulcanizer pot, a mold confined within said vulcanizer pot, mold moving means in said vulcanizer pot, a fluid receiver, fluid conducting means carried by said mold moving means leading from said fluid receiver to the interior of said mold, and means for supplying fluid under pressure to said fluid receiver.

15. An apparatus for forming and vulcanizing rubber articles, comprising a vulcanizing chamber, an article mold confined within said vulcanizing chamber, mold moving means in said vulcanizer pot, and means for conducting fluid to the interior of said mold independently of said chamber.

16. In a tire making apparatus, a tire mold, a vulcanizing chamber, mold moving means for applying pressure to said mold within the chamber, means for supplying fluid to the interior of a tire within the mold, and means for heating the vulcanizing chamber.

17. In a tire making apparatus, a tire mold, a vulcanizing chamber arranged to receive the mold, mold moving means for exerting pressure on the exterior of the mold, means for supplying fluid to the interior of a tire within the mold, and means for controlling the admission and venting of fluid to and from the interior of said tire.

18. An apparatus for forming and vulcanizing rubber articles, comprising a vulcanizer pot, a mold confined within said vulcanizer pot and having its chamber normally out of communication with the chamber of the vulcanizer pot, mold moving means in the vulcanizer pot and means for conducting fluid from the exterior of the vulcanizer pot to the chamber of the mold independent of the chamber of the vulcanizer pot.

In testimony whereof, I have signed my name to this specification, in presence of two subscribing witnesses.

MARK A. DEES.

Witnesses:
E. L. WALLACE,
N. G. BUTLER.